United States Patent [19]

Masuzawa et al.

[11] 4,393,460
[45] Jul. 12, 1983

[54] SIMULTANEOUS ELECTRONIC TRANSLATION DEVICE

[75] Inventors: Sigeaki Masuzawa, Nara; Yoshiro Kihara, Yamatokoriyama, both of Japan

[73] Assignee: Sharp Kabushiki Kaisha, Osaka, Japan

[21] Appl. No.: 186,610

[22] Filed: Sep. 12, 1980

[30] Foreign Application Priority Data

Sep. 14, 1979 [JP]  Japan ............................ 54-118569

[51] Int. Cl.³ .......................................... G06F 15/38
[52] U.S. Cl. ................... 364/900; 179/1 SM
[58] Field of Search ... 364/200 MS File, 900 MS File; 179/1 SM; 434/156, 157

[56] References Cited

U.S. PATENT DOCUMENTS 4,158,236  6/1979  Levy .................................... 364/900

FOREIGN PATENT DOCUMENTS 2014765  8/1979  United Kingdom ............ 179/1 SM

Primary Examiner—Raulfe B. Zache
Attorney, Agent, or Firm—Birch, Stewart, Kolasch and Birch

[57] ABSTRACT

An electronic translator which provides a translated word corresponding to an input word comprises at least one kind of input device for entering an input word and a plurality of output devices selectively actuated. Preferably, the input device consists of a voice-responsive circuit or a reader and the output devices comprise a voice synthesizer or a printer.

9 Claims, 2 Drawing Figures

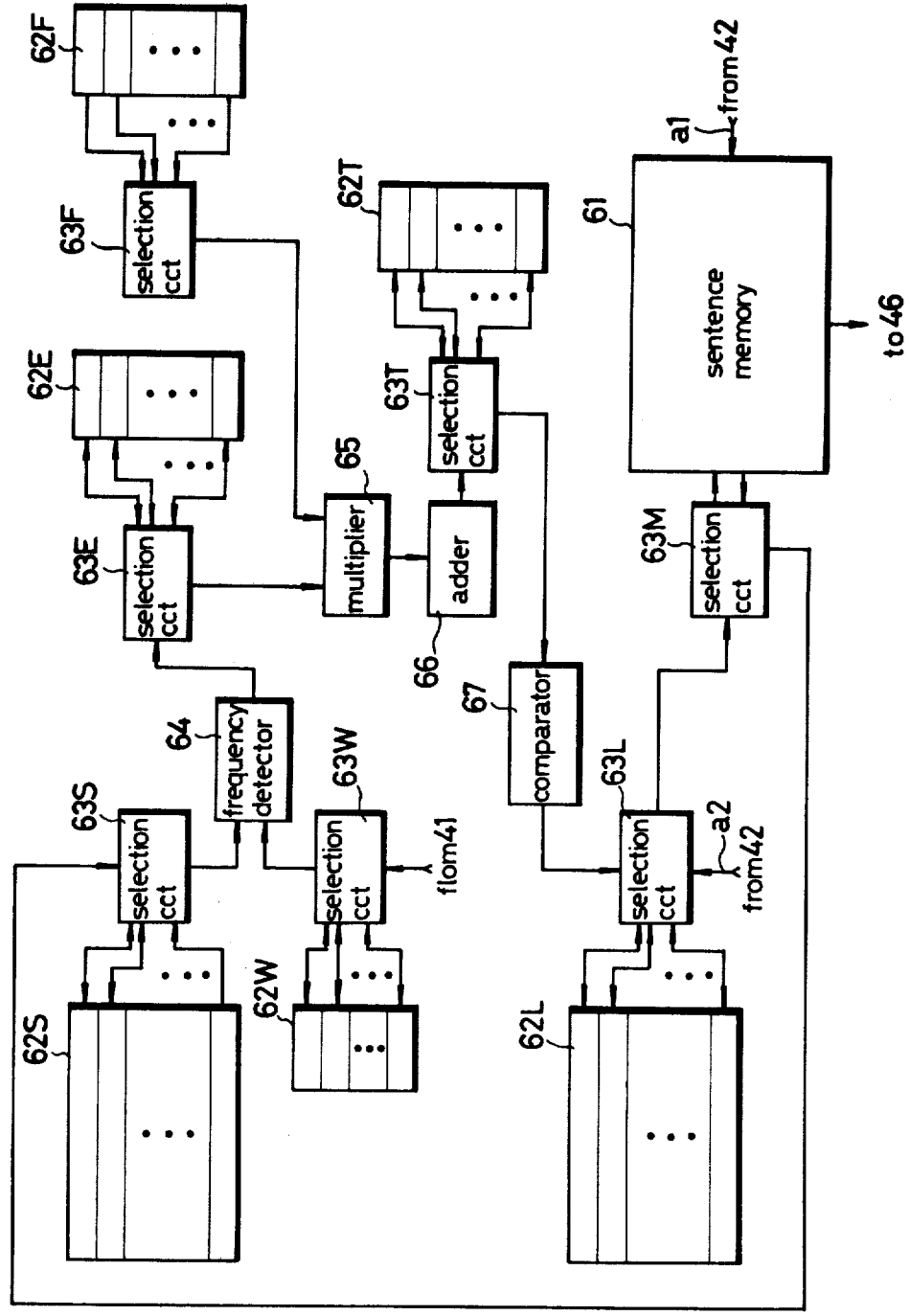

SIMULTANEOUS ELECTRONIC TRANSLATION DEVICE

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from any conventional electronic devices in that the former is of a unique structure which provides for efficient and rapid retrieval of word information stored in a memory. An example of such electronic translators was disclosed in Levy U.S. Pat. No. 4,158,236, June 12, 1979, "Electronic Dictionary and Language Interpreter".

The conventional electronic translators required a key input device for entering input word or words. Speed in input using the key input device was limited within a certain range, and is not equivalent to speed in generation of words in conversation. Therefore, the key input device is desired to be replaced by another high-speed input device.

In addition, the conventional electronic translators have a display as an output device. Capacity of the display was also limited and so the display was not useful for conversation purpose. Therefore, the display is also desired to be replaced by another large-capacity output device.

SUMMARY OF THE INVENTION

Accordingly, it is an object of the present invention to provisde an improved electronic translator free of the above-described problems.

It is a furthwer object of the present invention to provide an improved electronic translator comprising a high-speed input device and a large-capacity output device to enable simultaneous translation.

It is a further object of the present invention to provide an improved electronic translator comprising an input device comprising a voice responsive circuit or a reader, and an output device consisting of a voice synthesizer or a printer to enable simultaneous translation.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic translator comprises at least one kind of input device for entering an input word and a plurality of output devices selectively actuated to provide a translated word corresponding to the input word. Preferably, the input device consists of a voice-responsive circuit or a reader. The output devices may comprise a voice synthesizer or a printer.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIG. 2 shows a block diagram of a frequency analyzer connected in the circuit of FIG. 1.

DESCRIPTION OF THE INVENTION

Figure 1:
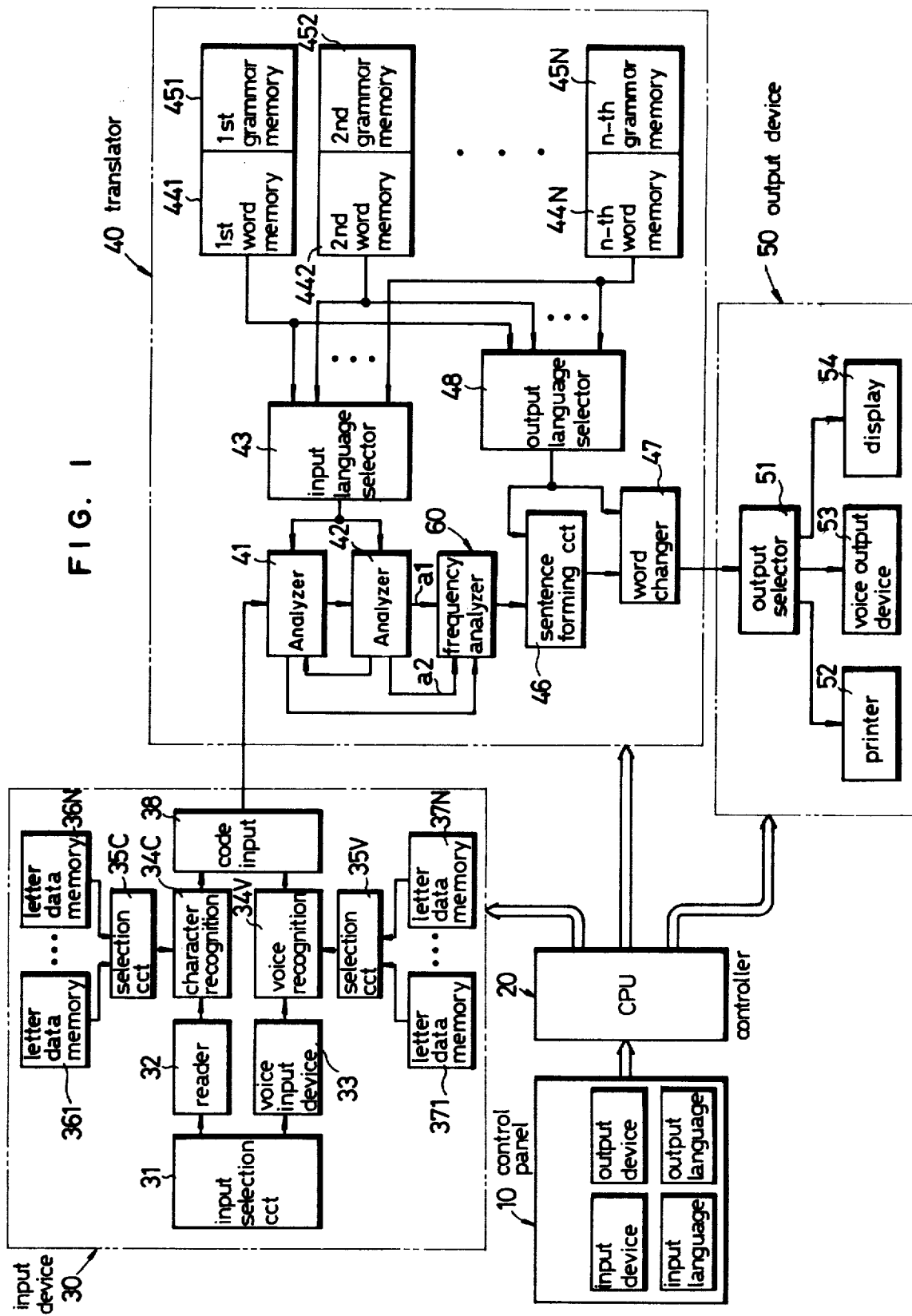
FIG. 1 shows a block diagram of a circuit according to the present invention.

First of all, any kind of languages can be applied to an electronic translator of the present invention. An input word is input in a specific language to obtain an equivalent word, or a translated word in a different language corresponding thereto. The kind of the language can be freely selected.

Referring now to FIG. 1, there is a circuit of the present invention. The circuit mainly comprises a control panel 10, a controller or central processing unit (CPU) 20, an input device 30, a translator 40, and an output device 50.

The panel 10 includes a plurality of switches which are actuated to select an input unit, an output unit, the kind of input language, and the kind of output language. The input unit is selected from a voice-responsive circuit and a reader. The output unit is selected from a voice synthesizer, a printer, or a display. Translation from Japanese to English is arried out where the input language is selected to be Japanese and the output language is selected to be English. Reverse translation may be carried out under the reverse conditions.

The input device 30 includes an input selection circuit 31, a reader 32, a voice-responsive circuit or voice input device 33, a character recognition device 34C, a voice recognition device 34V, selection circuits 35C and 35V, letter data memories 361 through 36N, voice data memories 371 through 37N, and a code input device 38.

The circuit 31 is responsive to the control panel 10 for selecting the input unit. The reader 32 functions to read characters or words. The voice input device 33 functions to enter characters or words by receiving an oral message.

The recognition device 34C is connected for recognizing the characters or words entered by the reader 32. The recognition device 34V is provided for recognizing the characters or words entered by the voice input device 33. The selection circuit 35C is responsive to the kind of the input language for selecting one of the memories 361 to 36N. Each of the memories 361 to 36N stores letter data patterns in a different language. The selection circuit 35V is responsive to the kind of the input language for selecting one of the memories 371 to 37N. Each of the memories 371 to 37N contains voice data patterns in a different language. The code input device 38 is provided for coding input data.

The translator 40 comprises two analyzers 41 and 42, an input language selector 43, word memories 441 to 44N, grammar memories 451 to 45N, a sentence-forming circuit 46, a word changer 47, an output language selector 48, and a frequency analyzer 60.

The analyzer 41 is responsive to the code input 38 for analyzing the characters or words at a unit of a word. The analyzer 42 is provided for analyzing syntax of the characters or words applied. Function of the frequency analyzer 60 is described below. Each of the memories 441 to 44N contains a plurality of words in a different language. Each of the memories contains grammar of a different language.

The output device 50 comprises an output selector 51, a printer 52, a voice synthesizer or voice output device 53, and a display 54. The output selector 51 is responsive to the selection by the control panel 10 for selecting one of these outputs 52 to 54.

FIG. 2 shows a more detailed block diagram of the frequency analyzer 60. The analyzer 60 includes a sentence memory 61, other memories 62L, 62W, 62S, 62E, 62F, and 62T, selection circuits 63M, 63L, 63T, 63W, 63E, and 63F, a frequency detector 64, a multiplier 65, an adder 66, and a comparator 67.

The memory 61 is responsive to the analyzer 42 and contains the whole characters or words forming a sentence entered by the input device 30. The portions of memory 62 contain sentences which are difficult to understand or which may be understood in two or more different ways of the whole sentence stored in the memory 61, the sentence being separated into short sentences capable of being understood and loaded in the memory 62. The memory 62W contains words difficult to be understood and units of words.

The memory 62S contains sentences before and after the sentence difficult to be understood, stored in the memory 61. The memory 62E contains the rate of recurrence, or the frequency of each of the words difficult to be understood, contained within the memory 62W. The memory 62E has storage capacity equivalent to that of the memory 62W for storing the words difficult to be understood.

The memory 62F contains a coefficient of importance of each of the sentences before and after the sentence contained within each portion of the memory 62S, the sentence being difficult to be understood. The memory 62T stores the sum of the frequency added to the coefficient of importance at each of the words impossible to be understood. The memory 62T has storage portions different from each other for each of the words difficult to be understood.

The circuit 63M causes the memory 61 to develop selected one of the whole sentence contained therein. The circuit 63L selects one of the sentences contained within the memory 62L. The circuit 63W selects one of the words contained in the memory 62W, such words being difficult to be comprehended. The circuit 63S selects one of the sentences contained in the memory 62S. The circuit 63E selects one of the memory portions of the memory 62E. The circuit 63F selects one of the memory portions of the memory 62F. The circuit 63T is provided for selecting one of the memory portions of the memory 62T.

The detector 64 is provided for detecting the frequency of words and sentences. The comparator 67 functions to detect the maximum value.

Tables 1 and 2, as shown below, indicate the contents of the memories 441 through 44N. Each of them contains a plurality of words in a different language together with codes representing the words, notes, and a plurality of fundamental syntax patterns.

TABLE 1

| Word | Code | Notes |
|---|---|---|
| word 1 | ACDJ | noun, the 1st person, singular |
| word 2 | BBF | verb, the present tense |
| . | . | . |
| . | . | . |
| word n | MOASL | the particle |
| sentence | 1 | |

TABLE 1-continued

| Word | Code | Notes |
|---|---|---|
| sentence | 2 | |
| . | . | |
| . | . | |
| sentence | m | |

TABLE 2

| word | code | notes |
|---|---|---|
| word 1 | FMO | the adjective, the comparative |
| word 2 | LPZ | the preposition |
| . | . | . |
| . | . | . |
| word w | NNS | the verb |
| sentence | 1 | |
| sentence | 2 | |
| . | . | |
| sentence | m' | |

Table 3 represents more detailed memory contents of one of the memories 441 through 44N in a certain language, say, English.

TABLE 3

| parts of words | | | parts of syntax patterns |
|---|---|---|---|
| word | code | notes | |
| apple | 101 . . . 1 | noun | syntax 1 → noun + be(verb) + noun |
| yeat | 101 . . . 0 | noun | syntax 2 → noun + be(verb) + adjective |
| run | 011 . . . 0 | verb intransitive | . |
| . | | | . |
| . | | | . |

Table 4 shows the memory contents of one of the memories 451 through 45N in a certain language, say, English.

TABLE 4

| syntax = | subject + verb |
|---|---|
| noun phrase = | adjective + noun |
| verb phrase = | noun + verb |
| passive voice = | A + be(verb) + past particle + B |
| progressive tense = | A + be(verb) + − ing (present particle) + B |
| . | . |

Table 5 shows a relation among the number of each of the syntax patterns contained within the memory 61, a coefficient of importance, and the frequency of a specific word L. Each coefficient of importance pertinent to each of the syntax patterns is contained within the memory 62F. The frequency of the word L is stored in the memory 62E.

TABLE 5

| number | sentence | coefficient of importance | frequency of the word L |
|---|---|---|---|
| 0 − m | . . . | g0 − m | α(L, 0 − m) |
| 0 − (m + 1) | . . . | g0 − (m + 1) | α(L,0 − (m + 1)) |
| . | . | . | . |
| . | . | . | . |

TABLE 5-continued

| number | sentence | coefficient of importance | frequency of the word L |
|---|---|---|---|
| . | . | . | . |
| 0 − 1 |  | g0 − 1 | α(L, 0 − 1) |
| 0 | ... | g0 | α(L, 0) |
| 0 + 1 |  | g0 + 1 | α(L, 0 + 1) |
| . | . | . | . |
| . | . | . | . |
| 0 + (n − 1) | ... | g0 + (n − 1) | α(L, 0 + (n − 1)) |
| 0 + n | ... | g0 + n | α(L, 0 + n) |

Operation for translation of a sentence from a language to a different language is described with reference to FIGS. 1 and 2, and Tables 1 through 5.

First of all, the control panel 10 is acutated to select a particular kind of input device, a particular kind of output device, a specific type of input language, and a type of output language. The reader 32 is selected for the purpose of reading sentences printed on papers, or in books. The reader 32 is activated by applying signals to the circuit 31 by means of the CPU 20. Preferably, the reader 32 is composed of an optical character reader (OCR). The reader 32 provides signals representing the characters being scanned.

According to the input language selected by the panel 10, the CPU 20 causes the circuit 35C to select one of the memories 361 to 36N in agreement with the kind of input language. The selected one of the memories 361 to 36N provides letter data stored therein to the recognition device 34C. The device 34C is operated to compare character patterns read by the reader 32 and the letter data developed by one of the memories 361 to 36N. Then, the characters entered by the reader 32 are recognized and sent to the code input device 38.

On the other hand, spoken meassage would be input as follows. The panel 10 is actuated to select the voice input device 33. The CPU 20 permits the circuit 31 to select the device 33. The spoken message is applied to the device 33 as verbal information by means of a microphone etc. The device 33 converts the verbal information to electrical signals entering the recognition device 34V.

At the same time, the CPU 20 permits the circuit 35V to select one of the memories 371 to 37N which stores verbal data corresponding to the kind of the input language selected by the panel 10. The device 34V continues to receive thus selected verbal data with the help of the circuit 35V. Therefore, the device 34V is operated for comparing the verbal information applied by the device 33 and the verbal data contained in the selected one of the memories 371 to 37N. The device 34V recognizes the verbal information entered and sends the verbal information to the device 38.

The device 38 is responsive to the device 34C or 34V for changing the character data or the verbal information to code information of a suitable format and for applying the code information to the analyzer 41 within the translator 40.

According to the kind of the input language specified by the panel 10, the CPU 20 controls the selector 43 within the translator 40 so that the selector 43 selects one of the memories 441 to 44N which stores words in the input language selected. Further, the selector 43 selects one of the memories 451 through 45N which stores grammar about the input language selected. The selector 43 causes one of the memories 441 to 44N, e.g., the memory 441 of the first language, and one of the memories 451 to 45N, e.g., the memory 451 of the first language to respectively provide words and grammar in the first language to the analizers 41 and 42.

The analizer 41 is responsive to the words applied by the memory 441 for dividing a sentence applied to the device 38 into words, the sentence applied by the device 38 gathering a great number of codes each indicative of a single verbal sound or a single character. At the same time, the analyzer 41 extracts notes accompanying the words relating to, e.g., the parts of speech, the case, the tense, and the person. The notes extracted are entered to the analyzer 42. Responsive to the notes, the words developed by the memory 441, and the grammar developed by the memory 451, the analyzer 42 determines an appropriate syntax pattern. The syntax pattern determined is applied to the circuit 46 through the frequency analizer 60.

The selector 48 selects one of the memories 441 to 44N corresponding to the kind of the output language selected by the panel 10, and one of the memories 451 through 45N corresponding to the kind of the output language selected by the panel 10. The selector 48 is operated for in turn addressing data from one of the memories 441 to 44N, e.g., the memory 442 of the second language, and from one of the memories 451 to 45N, e.g., the memory 452. The data are introduced to the circuit 46 and the changer 47.

The circuit 46 is operated for comparing the sentence in the input language entered and various sentences in the output language developed from the memory 452 by means of the selector 48 to determne an appropriate syntax pattern in the output language. The appropriate syntax pattern is admitted to the changer 47. The changer 47 is operated to replace the words of the sentence in the first language, the syntax for the sentence being determined, with the words in the second language, by using the words in the second language developed by the memory 442. Thus obtained syntax in the second language is applied to the selector 51.

Responsive to the output from the changer 47, the selector 51 is adapted to select one of the output devices 52 to 54 according to the selection by the panel 10, through the CPU 20. Translated sentences are applied to the selected output device 52, 52 or 54.

In the case where the voice output device 53 is selcted, the coded information representing the translated sentence is applied from the changer to the device 53. The device 53 provides verbal information to the operator. The device 53 is a speech sysnthesizer which is well-known in the art as shown in Hyatt U.S. Pat. No. 4,060,848, issued Nov. 29, 1977, "Electronic Calculator System Having Audio Messages for Operator Interaction".

Either the printer 52 or the display 54 can be selected. It is sufficient to select at least one from the device 52, 53 and 54. If desired, at least two kinds of devices selected from the devices 52, 53 and 54 can be simultaneously operated to provide at least two types of output format.

In the case where a syntax difficult or impossible to be comprehended in view of the grammar is present while applied in the anlyzer 42, the difficulty is eliminated by the following process. In such a case, a feed back is applied to the analyzer 41 from the analyzer 42 so that the analyzer 41 amends its dividing operation to the analyzer 42. While the analyzer 42 provides two or more sentences, the analyzer 60 determines a syntax and the words for the purpose of forming a sentence.

More particularly, the coded information indicative of a sentence produced by the analyzer 42 is introduced into the memory 61 within the analyzer 60 as shown in FIG. 2. When a paticular Japanese sentence

" ﾊﾄﾊｼﾛｸﾀﾙﾍｷﾃﾌﾙ "

is applied, there are possibilities that the sentence is understood to be   " ﾊﾄ , ﾊ , ... "
and       " ﾊ , ﾄﾊ , ... "
since the both sentences are correct in the Japanese grammatical aspect although each of them indicates different meaning. The analyzer 42 can not decide which interpretation is appropriate.

In this case, the analyzer 60 is operated to determine which sentence is appropriate. It is now supposed that the number of the sentence is "0". The sentence, the meaning of which can be comprehended in different ways by the analyzer 42, is applied to the memory 62L through the circuit 63L. The memory 61 contains the whole "0" numbered sentence the meaning of which can be comprehended in different ways. The circuit 63M is operated to select sentences extending m lines before the "0" numbered sentence and sentences extending n lines after the "0" numbered sentence. The m-line sentences and the n-line sentences are admitted to the respective memory cells of the memory 62S through the memory 63S, depending on the number of the sentences.

Table 5 shows the contents of the memory 62 storing each of different items in each of different memory cells. It should be noted that, when the "0" numbered sentence is being examined, the sentence following the "0" numbered sentence has not been examined yet. The analyzer 60 is not operated until the "0+n" numbered sentence has been examined already. The values of m and n depend on the kind of sentence and the number of the whole sentences.

The analyzer 41 develops one or more words which are difficult to be comprehended and are contained within the "0" numbered sentence. In this case, the words are   " ﾊﾄ "
(="ha-to") and    " ﾊ "
(="ha"). Such words are applied to the memory 62W through the circuit 63 W.

The detector 64 detects the frequency of such words difficult to be comprehended in each of the numbered sentences amounting to "m+n" from "0−m" to " +n" except for the "0" numbered sentence. The thus detected frequency in each of the sentences is introduced into each of the memory portions pertinent to each of the sentences within the memory 62E through the circuit 63E.

The memory 62F preliminarily stores each coefficient of importance in each of the numbered sentences before and after the "0" numbered. The circuit 63F causes the memory 62F to develop each coefficient of importance, in synchronization with each of the numbered sentences selected by the circuit 63S. At the same time, the frequency of such words difficult to be comprehended, being selected by the circuit 63E and being contained within each of the numbered sentences, is introduced into the multiplier 65.

The multiplier 65 is provided to multiply the frequency of such words in each of the sentences by each coefficient of importance in each of the sentences. The results, called the frequency with the coefficient of impotance, are admitted to the adder 66. The adder 66 is provided for adding various kinds of results obtained by the multiplier 65 with respect to each of all the numbered sentences stored in the memory 62S. The thus added results are admitted to each of the memory portions of the memory 62T, depending on the kind of word, through the circuit 63T.

The above-described operations are repeated upon each of such words difficult to be comprehended. Finally, this leads to the conditions that each of the memory portions of the memory 62T contains the sum of the frequency with the coefficient of importance in each of such words.

The following is the reason why the frequency of words to be comprehended is counted and then the thus detected frequency is multiplied by the coefficient of importance, with the object to interpret a sentence capable of being comprehended in different ways in the grammatical aspect:

At least two sentences have a particular plot or story, usually. As long as the sentences follow the thread of the plot or story, connection or relation is stronger between the sentences closely adjacent than between those distantly separated. The farther the two sentences are separated, the less the connection or relation between them likely becomes. Since words form a sentence, that the two sentences are related to each other means that words related to one another are present. The frequency of a word in a certain sentence can be determined to some extent by detecting the frequency of the words in different sentences before and after the certain sentence. The connection or relation between the two sentences is required to be represented. A coefficient of importance indicates the connection or relation.

The sum of a certain frequency with the coefficient of importance in each of the numbered sentences stored in the memory 62S is represented by the following formula:

$$E_L = G_L(0 - m) + G_L(0 - m + 1) + \ldots + G_L(0 - 1) + \quad (1)$$
$$G_L(0 + 1) + \ldots + G_L(0 + (n - 1)) + G_L(0 + n)$$
$$= g_{0-m} \cdot a(L, 0 - m) + g_0 - (m + 1) \cdot$$
$$a(L, 0 - (m + 1)) + \ldots + g_{0-1} \cdot a(L, 0 - 1) + g_{0+1} \cdot$$
$$a(L, 0 + 1) \ldots + g_{0+(n-1)} \cdot$$
$$a(L, 0 + (n - 1)) + G_{0+n} \cdot a(L, 0 + n)$$

where $E_L$: the sum of the frequency with the coefficient of importance in a word numbered "L"

$G_L(K)$: the frequency with the coefficient of importance of the "L" numbered word among the "K" numbered sentence $g_K$: the coefficient of importance of the "K" numbered sentence $a(L,K)$: the frequency of the "L" numbered word among the "K" numbered sentence Magnitudes of the coefficient of importance are usually as follows:

$$g_{0-1} > g_{0-2} > \ldots > g_{0-(m+1)} > g_{0-m} > 0$$

$$g_{0+1} > g_{0+2} > \ldots > g_{0+(n-1)} > g_{0+n} > 0$$

After the sum of $E_L$ is obtained with respect to each of such words difficult to be comprehended and the thus obtained sum is stored in each of the memory portions of the memory 62T, the following operation is performed to finally interpret such words.

The circuit 63T causes the memory 62T to develop the sum of the frequency with the coefficient of importance in each of such words. The sum developed is applied to the comparator 67. The comparator 67 is operated to detect the maximum value of the sum of the frequency with the coefficient of importance in each of such words and it provides signals entering the circuit 63L. The signals are used to select one of syntax patterns, which contains the words providing the maximum value.

The circuit 63L is responsive to the signals developed by the comparator 67 for taking out one of the syntax patterns which contains the words providing the maximum value detected by the comparator 67, from the plurality of syntax patterns stored in the memory 62L. The thus selected one of the syntax patterns is entered to a part of memory portion, within the memory 61, corresponding to the "0" numbered sentence, through the circuit 63M.

Thus, an appropriate syntax is applied to the circuit 46 by analyzing and interpreting it according to the calculating operation. Thereafter, the similar operation as described earlier is carried out.

As described above, in accordance with the present invention, in the case where at least two different types of meanings can be interpreted even by using the syntax patterns contained within the memory, words contained within the sentence difficult to be comprehended are correlated to appropriate and different words on the basis of the frequency of the words in sentences preceding the sentence and sentences followings the sentence. The words contained within the sentence impossible to be comprehended are replaced by the appropriate and different words. And so, the sentence containing the appropriate and different words is subjected to translation. It should be noted that an additional algorithm is not required for the purpose of entering sentences in aninput language to be translated. This facilitates the input operation.

While ony certain embodiments of the present invention have been described, it will be apparent to those skilled in the art that various changes and modifications may be made therein without departing from the spirit and scope of the invention as claimed.

What is claimed is:

1. An electronic dictionary and language interpreter device wherein first words represented in a first language selected from a plurality of languages are entered to obtain second words represented in a second language selected from the plurality of languages, said second words being equivalent to the first words, said device comprising:
    selection means for selecting the first language and the second language;
    reader means for reading the first words and for entering the first words in the first language;
    recognizing means responsive to said reader means for recognizing the first words;
    translation means responsive to the recognizing means for translating the first words into the second words in the second language;
    output means responsive to the translation means for providing the second words, the output means comprising a plurality of output devices; and
    switching means actuated to select at least one of the plurality of output devices within the output means and to permit said output means to develop the second words.

2. An electronic dictionary and language interpreter device wherein first words represented in a first language selected from a plurality of languages are entered to obtain second words represented in a second language selected from a plurality of languages, said second words being equivalent to the first words, said device comprising:
    selection means for selecting the first language and the second language;
    voice responsive means for verbally receiving the first words and for entering the first words in the first language;
    recognizing means responsive to said voice-responsive means for recognizing the first words;
    translation means responsive to the recognizing means for translating the first words into the second words in the second language;
    output means responsive to the translation means for providing the second words, the output means comprising a plurality of output devices; and
    switching means actuated to select at least one of the plurality of output devices within the output means and to permit said output means to develop the second words.

3. The device of claim 2, further comprising reader means for reading the first words and for entering the first words, said recognizing means being selectively responsive to said reader means.

4. The device of claim 1 or 2, wherein the plurality of output devices comprises a printer means for printing the second words and a voice synthesizer means for verbally providing the second words.

5. The device of claim 1 or 2, wherein the plurality of output devices comprises a printer means for printing the second words and a display means for displaying the second words.

6. The device of claim 1 or 2, wherein the plurality of output devices comprises a voice synthesizer means for verbally providing the second words and a display means for displaying the second words.

7. The device of claim 1 or 2, wherein the plurality of output devices comprises a printer means for printing the second words, a voice synthesizer means for verbally providing the second words, and a display means for displaying the second words.

8. The device of claim 1 or 2, wherein said first words are entered in sequence, said sequence being divided into a plurality of intervals, the translation means comprising:
    first memory means responsive to the recognizing means for storing the first words entered;
    second memory means for storing a coefficient of importance related to each interval of the entered first words;
    frequency detecting means associated with said second memory means for detecting the frequency of occurrence of at least one selected entered first word;
    modifying means for modifying the coefficient of importance related to each interval based upon the frequency of occurrence of the at least one selected word within each respective interval;
    means associated with said modifying means for calculating the probability of occurrence of the at least one selected word in at least two contexts, said selected word having a different meaning in each context; and means responsive to the calculating means for determining the meaning of the at least one selected word by comparing the respective probabilities of occurrence of the at least one selected word with that calculated by the calculating means.

9. The device of claim 1 or 2 further comprising means responsive to the frequency of occurrence of at least one first word for determining which second word is equivalent to said at least one first word.

* * * * *